US010210550B2

(12) United States Patent
Amit et al.

(10) Patent No.: US 10,210,550 B2
(45) Date of Patent: Feb. 19, 2019

(54) AUTOMATIC IMAGE COMPOSER

(71) Applicant: XCircular Ltd., Holon (IL)

(72) Inventors: Aviel Amit, Holon (IL); Meron Simcha Lavie, Oranit (IL)

(73) Assignee: XCIRCULAR LTD., Holon (IL)

(*) Notice: Subject to any disclaimer, the term of this patent is extended or adjusted under 35 U.S.C. 154(b) by 0 days.

(21) Appl. No.: 15/030,885

(22) PCT Filed: Oct. 29, 2014

(86) PCT No.: PCT/IB2014/065680
§ 371 (c)(1),
(2) Date: Apr. 21, 2016

(87) PCT Pub. No.: WO2015/063696
PCT Pub. Date: May 7, 2015

(65) Prior Publication Data
US 2016/0260138 A1 Sep. 8, 2016

Related U.S. Application Data

(60) Provisional application No. 61/897,279, filed on Oct. 30, 2013.

(51) Int. Cl.
G06T 3/40 (2006.01)
G06Q 30/02 (2012.01)
(Continued)

(52) U.S. Cl.
CPC ..... *G06Q 30/0276* (2013.01); *G06Q 30/0641* (2013.01); *G06T 3/40* (2013.01);
(Continued)

(58) Field of Classification Search
CPC .................................................. G06Q 30/0276
(Continued)

(56) References Cited

U.S. PATENT DOCUMENTS 6,456,305 B1* 9/2002 Qureshi ............ G06F 17/30905
707/E17.121
8,706,572 B1* 4/2014 Varadarajan ........... G06Q 30/00
705/27.2

(Continued)

OTHER PUBLICATIONS

Wu, Zhipeng, and Kiyoharu Aizawa. "Picwall: Photo collage on-the-fly." In Signal Processing Association Annual Summit and Conference (APSIPA), 2013 Asia-Pacific, pp. 1-10. IEEE, Oct. 29, 2013. (Year: 2013).*

Primary Examiner — Frank D Mills
(74) Attorney, Agent, or Firm — Mark M. Friedman

(57) ABSTRACT

An Automatic Image Composer (AIC) of a computer system, linked to a computer and/or communications network, creates a composition of numerous product images as a single image as an electronic document. The products in the composition (single image) are dimensioned relative to their actual or "real world" dimensions, and dimensions relative to each other. The products of interest, are typically determined and selected by each of the individual customers of the computer system which includes the AIC, "on-the-fly." The composition is suitable for being made into an electronic graphic, such as a web page, banner, or the like, typically for computer, tablet and mobile phone displays.

23 Claims, 14 Drawing Sheets

(51) Int. Cl.
*G06T 11/60* (2006.01)
*G06Q 30/06* (2012.01)
*H04N 1/387* (2006.01)

(52) U.S. Cl.
CPC .......... *G06T 11/60* (2013.01); *H04N 1/3873* (2013.01); *G06T 2210/32* (2013.01)

(58) Field of Classification Search
USPC ........................................................ 715/244
See application file for complete search history.

(56) References Cited

U.S. PATENT DOCUMENTS

| | | | | |
|---|---|---|---|---|
| 2002/0052891 | A1* | 5/2002 | Michaud | G06F 17/30905 715/247 |
| 2004/0044587 | A1* | 3/2004 | Schwartzman | G06Q 30/02 705/26.62 |
| 2007/0058884 | A1* | 3/2007 | Rother | G06K 9/469 382/284 |
| 2009/0013268 | A1* | 1/2009 | Amit | G06T 11/60 715/763 |
| 2010/0073381 | A1* | 3/2010 | Adams | G06T 11/001 345/473 |
| 2011/0016376 | A1* | 1/2011 | Hinson | G06F 17/30899 715/205 |
| 2012/0158551 | A1* | 6/2012 | Gonsalves | G06Q 30/0643 705/27.2 |
| 2014/0086508 | A1* | 3/2014 | Tang | G06K 9/00684 382/284 |

\* cited by examiner

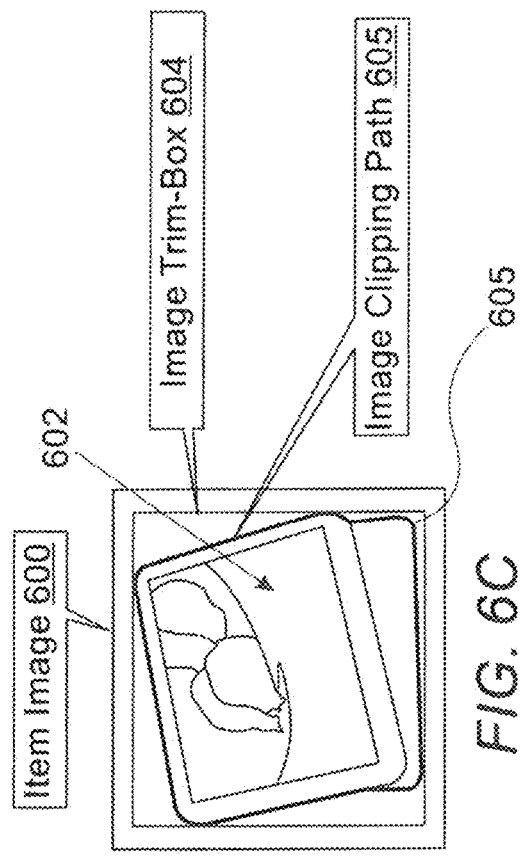

AUTOMATIC IMAGE COMPOSER

CROSS-REFERENCES TO RELATED APPLICATIONS

This application is related to and claims priority from commonly owned U.S. Provisional Patent Application Ser. No. 61/897,279, titled: Automatic Image Composer, filed on Oct. 30, 2013, the disclosure of which is incorporated by reference in its entirety herein.

TECHNICAL FIELD

The present invention relates to automatic image compositions and composing web pages and other electronic graphics from these automatic image compositions.

BACKGROUND

Contemporary advertising over electronic media is quickly shifting toward personalization or grouping products based on people's interest in the relatedness of the products. Even the best web pages typically provide multiple products that span multiple screens, such that these web pages remain ineffective or inefficient.

For example, many advertiser web pages are lengthy and require users, such as mobile users and desktop, tablet and laptop users, to scroll over many ads. This scrolling typically reaches the point where these users lose interest, and leave the web page, never seeing many products. As a result, an advertiser's efforts are lost on that user, an unwanted result. Additionally, the list of relevant products for the advertiser's web page is often constructed "on-the-fly" as it is not determinable in advance.

SUMMARY

The present invention provides an Automatic Image Composer (AIC), as part of a computer system, which is capable of creating a single image composed of all product (also known as an item) images of interest, as determined "on-the-fly" by each customer of the system of the present invention.

Throughout this document, the terms "product(s)", "item(s)", and "object(s)" are used interchangeably. Additionally, the terms "real world" and "actual", when referencing a product's dimensions, sizes, or other characteristics, are the true dimensions, sizes or other characteristics of the actual product itself.

Throughout this document, the term "aspect ratio" is the ratio between the dimensions of a geometric shape, such as that of a product, item, or object, specified as the ratio of height/width. For example, the "aspect ratio" of an image is the proportional relationship between its height and its width.

A "server" is typically a computer, such as remote computer or remote machine or computer system (or portion thereof), that is accessible over a communications medium, such as a communications network or other computer network, including the Internet. A "server" provides services to, or performs functions for, other computer programs (and their users), in the same or other computers or machines. A "server" may also include a virtual machine, a software based emulation of a computer or machine.

Throughout this document, a "web site" is a related collection of World Wide Web (WWW) files that includes a beginning file or "web page" called a home page, and typically, additional files or "web pages." The term "web site" is used collectively to include "web site" and "web page(s)."

"n" and "$n^{th}$", and "N" and "$N^{th}$" in the description below and the drawing figures represent the last member of a series or sequence of members, such as elements, servers, databases, caches, components, listings, links, data files, etc.

A "Uniform Resource Locator (URL)" is the unique address for a file, such as a web site or a web page that is accessible on the Internet or other public or wide area network.

An "application", includes executable software, and optionally, any graphical user interfaces (GUI), through which certain functionality may be implemented.

A "client" is an application that runs on a computer, workstation or the like and relies on a server to perform some of its operations or functionality.

An Automatic Image Composer (AIC) of a computer system, linked to a computer and/or communications network, creates a composition of numerous product images as a single image as an electronic document. The products in the composition (e.g., the single image) are arranged therein as dimensioned relative to their actual or "real world" dimensions, and dimensions relative to each other. The products of interest are typically determined and selected by each of the individual customers of the computer system which includes the AIC, "on-the-fly." The composition is scalable in accordance with desired or target sizes, for example, in pixels or linear measure, such as lengths in measurable units such as meters. The composition is the basis for electronic graphics, such as a web pages, banners, or the like, for example, for computer, tablet and mobile phone screen displays.

In one embodiment, the single image in HTML5 (HTML stands for hypertext markup language) format is interactive, where each product is clickable (i.e., is a hyperlink). The result is that a single image becomes a user menu including all promotions and best selling products (or, on some embodiments, a personalized list of preferred products based on user history), arranged in a single-view image displayed on a PC/laptop monitor, mobile phone or tablet. In a single click on the desired product's image within the composite image, the user links to the full information needed to complete the sale.

Similarly, for in-store print ads and product families, group photos can be created using this tool, thus eliminating the need for additional photography and saving on graphic design. The disclosed Automatic Image Composer (AIC), for example, can run on a cloud server and is capable of creating personalized image compositions for products, services and the like on the fly.

The composite image improves the user experience and click-through rates of mobile (and other) users by removing all menu layers the users usually need to go through by allowing the user to click just once on an image and to reach the desired product on sale. The Automatic Image Composer is a productivity tool which accurately automates the composition of multiproduct images into a single subjectively pleasing visual.

Embodiments of the present invention are directed to processes for the arrangement of a multiplicity of item images into a single, composite image which provides the visual effect as needed for item promotion, advertisements, etc. The resulting visual effect approximates a physical item arrangement as it would otherwise have to be photographed in a photo-studio.

Embodiments of the present invention are such that given item images 1 . . . n, the disclosed methods and processes make use of an item's real world height H1 . . . Hn and/or width W1 . . . Wn, as well as using the item's image clipping path CP(1) . . . CP(n), where the clipping path is a set of 1 . . . N Bézier curves which define the outline of a product vis-à-vis the background in the image. The height and/or width, the clipping path, and other image information are extracted from a system database, or supplied by a system accessing the AIC.

Embodiments of the present invention are such that given item images, for solving spatial shape arrangements within a specified area, the disclosed methods and processes calculate the dimensions and the position of each image $\{i|i=1 \ldots n\}$ in a sorted list, within the final image composition, based solely on size and X, Y, and Layer position of, at most, two other images.

Embodiments of the present invention are directed to a computer-implemented method for creating an electronic graphic. The computer-implemented method comprises: obtaining, by a processor, a selection of at least one product; obtaining, by a processor, a corresponding product image for the at least one product; arranging, by a processor, the at least one product image in accordance with a display pattern to maintain the relative actual dimensions of the at least one product, and to define a composition which includes the at least one product image; and, scaling, by a processor, the composition in accordance with one of a target size or a target aspect ratio.

Optionally, the relative dimensions of the at least one product are proportional to the dimensions of the actual at least one product.

Optionally, the target size of the composition is in one of pixels or linear measure.

Optionally, the computer-implemented method additionally comprises: associating at least one activatable action with the at least one product image in the electronic graphic form.

Optionally, the at least one activatable action includes at least one of: a link to a network destination, shopping transaction, electronic commerce transaction, graphic effect, user, e.g., end user or consumer, interaction.

Optionally, the at least one product includes at least two products.

Optionally, the relative actual dimensions of the at least two products are proportional to the dimensions of the corresponding actual at least two products.

Optionally, the target size is in one of pixels or linear measure.

Optionally, the display pattern is from a plurality of display patterns. Optionally, the display pattern allows for overlap of the product images.

Optionally, the display pattern allows for spacing between the product images.

Optionally, the computer-implemented method additionally comprises: associating at least one activatable action with the at least two product images in the electronic graphic form.

Optionally, the at least one activatable action includes at least one of: a link to a network destination, shopping transaction, electronic commerce transaction, graphic effect, user interaction.

Optionally, the composition is an electronic document, transmittable over a computer network, and which serves as the basis for the electronic graphic.

Optionally, the obtaining, by a processor, a selection of at least one product includes receiving, by the processor, the selection of the at least one product.

Embodiments of the present invention are directed to a computer system for creating an electronic graphic. The computer system comprises: a storage medium for storing computer components and a computerized processor for executing the computer components. The computerized components comprise: a first component for obtaining a selection of products; a second component for obtaining a corresponding product image for the products; a third component for arranging the product images in accordance with a display pattern to maintain the relative actual dimensions of the products, and to define a composition which includes the product images; and, a fourth component for scaling the composition in accordance with one of a target size or a target aspect ratio.

Optionally, the computer system additionally comprises: a fifth component for associating at least one activatable action with the product images in the electronic graphic form.

Optionally, the at least one activatable action includes at least one of: a link to a network destination, shopping transaction, electronic commerce (e-commerce) transaction, graphic effect, user interaction.

Optionally, computer system additionally comprises: an additional component for arranging the product images includes overlapping the product images with respect to each other.

Optionally, the computer system additionally comprises: an additional component for arranging the product images to allow for spacing between the product images.

Optionally, the obtaining the selection of products includes receiving the selection of products.

Embodiments of the present invention are also directed to a computer usable non-transitory storage medium having a computer program embodied thereon for causing a suitable programmed system to create an electronic graphic, by performing the following steps when such program is executed on the system. The steps comprise: obtaining a selection of products; obtaining a corresponding product image for the products; arranging the product images in accordance with a display pattern to maintain the relative actual dimensions of the products, and to define a composition which includes the product images; and, scaling the composition in accordance with one of a target size or a target aspect ratio.

Optionally, the relative actual dimensions of the products are proportional to the dimensions of the corresponding actual products.

Optionally, the target size is in one of pixels or linear measure.

Optionally, the display pattern is from a plurality of display patterns.

Optionally, the display pattern allows for overlap of the product images.

Optionally, the display pattern allows for spacing between the product images.

Optionally, the steps additionally comprise: associating at least one activatable action with the at least two product images in the electronic graphic form.

Optionally, the at least one activatable action includes one of: a link to a network destination, shopping transaction, electronic commerce transaction, graphic effect, user interaction.

Optionally, the obtaining a selection of products includes receiving the selection of the products.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 6A-16C are illustrations of product arrangements and other features of associated with the processes of embodiments of the present invention;

DETAILED DESCRIPTION

Figure 1:
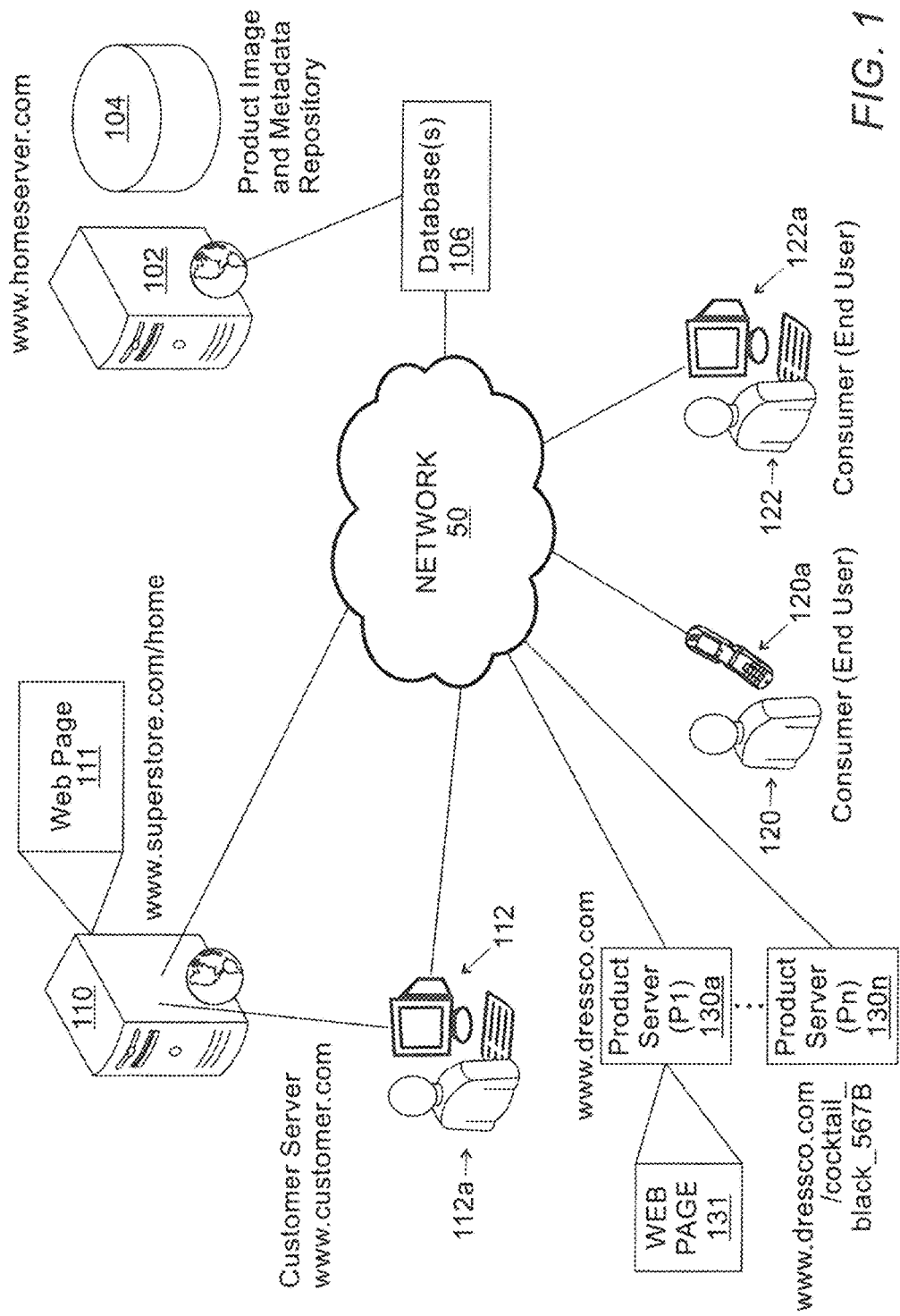
FIG. 1 is a diagram of an exemplary environment in which embodiments of the present invention are performed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s), which are non-transitory, may be utilized. The computer readable medium may be a non-transitory computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Throughout this document, numerous textual and graphical references are made to trademarks, and domain names. These trademarks and domain names are the property of their respective owners, and are referenced only for explanation purposes herein.

Reference is now made to FIG. 1, which shows an operating environment for a home server (HS) or main server 102, which defines a non-limiting exemplary computer system, in accordance with some embodiments of the present invention. The home server 102 is shown linked over a network 50, either directly or indirectly. The home server 102 is located at a network node or endpoint. The network 50 is typically a public network, such as the Internet, but may also be any wide area network WAN, local area network (LAN) or other computer and/or communications network. "Linked" as used herein includes both wired or wireless links, either direct or indirect, and placing the computers, including, servers, components and the like, in electronic and/or data communications with each other.

The home server 102 is, for example, a secure server, which processes information received from and requested by customers, produces and provides products in accordance with embodiments of the present invention, and provides analytics, accounting and other administrative functions, in accordance with embodiments of the present invention. The home server 102 functions, for example, as an automatic image composer (AIC). The home server 102 includes a computing platform for execution of all logic, computations, input/output, copying and accessing of data, and communications with external systems and entities. The home server 102 has a URL of www.homeserver.com.

The home server 102 is shown linked to a product image and metadata repository 104, and databases 106, representative of numerous storage media or data bases to which the server 102 may be linked. While the home server 102 is shown directly linked to the image and metadata repository 104, it may be linked thereto over the network 50.

The home server 102 includes logic, such as processors 230 and storage/memory 232 (FIG. 2) for storing machine executable instructions for performing the operations of the present invention, including, for example, arranging the images in the compositions. The home server 102 may be a local server or a remote/cloud server. The user interacts with the remote/cloud server via a client application or a web service. The Automatic Image Composer of the home server 102, whether a client side application or a web service, offers, in some embodiments, includes features including:

(a) Images—Upload images with embedded clipping paths to enable rich types of image compositions over desired background;

(b) Size of resulting image—Set the desired width and/or height of the image in pixels;

(c) Layout—Predefined composition outlines in which the selected images can automatically be arranged;

(d) Alignment—Horizontal alignment of images to left, center and right of the composed image;

(e) Spacing—Select the spacing between image subjects and frame around the composed image;

(f) Image Sizes—Keep either the proportional real world (actual) product (item) size or standardize for equal width or equal height for all images in the composition; and, (g) Hot Images—each product in the composed image is selectable, linking to its own page, allowing the creation of a single layer visual interactive menu.

The image and metadata repository 104, is a storage media, and includes for example, databases for storing product graphic images and product metadata.

While numerous components are detailed below, numerous servers, machines, devices, computer systems and the like may be linked, either directly or indirectly, to the network 50, for operation with the home server 102.

A customer server 110, representative of numerous customers is linked to the network 50. These customer servers 110 (for example, the customer server 110 has a URL of www.customer.com) are or are parts of computer systems that host web sites associated with the customer 110 (for example, the customer runs the online retail outlet known as SuperStore, with a website URL of www.superstore.com). The web site includes web pages, for example, web page 111, with the customer's address, the URL www.superstore.com/home, where web pages, electronic graphics, electronic documents, which utilize compositions produced. Customers, such as those associated with the server 110, web page 111 and a customer 112a, who enters inputs to the server 110 as well as the home server 102, through his computer 112, include, for example, merchants, advertisers of goods and services, businesses, and information providers, and the like. The customer server 110 may link directly, or indirectly, to the network 50. The customer's computer 112, also links directly or indirectly to the network as well as to the customer server 110.

Consumers, also known as end consumers or end users, 120, 122 are linked to the network 50 via their computers, including, for example a smart phone 120a (either through WiFi® or a cellular network), or computer 122a, shown as a desktop. The desktop computer 122a is representative of other computers, such as an iPad® from Apple, laptop, personal digital assistant or other hand held computer. The consumers, represented, for example, by consumers 120, 122, are capable of receiving electronic mail (e-mail) and other electronic communications, and these computers have operating systems such as Apple OS, MAC OS, PC (IBM) OS, and browsing applications, such as Internet Explorer® from Microsoft, Safari® from Apple, and, Firefox® from Mozilla.

Product servers (P1-Pn) 130a-130n, representative of numerous product providers, for example, those sold on a customer's web site, such as the web site (and web page 111) hosted by the customer server 110, are linked to the network 50. These product servers 130a-130n are or are parts of computer systems that host web pages 131 for products, such as those products displayed on the aforementioned customer web pages, e.g., web page 111 of a customer.

For example, product server P1 130 hosts web pages of Dressco, a supplier of woman's dresses, which are sold on SuperStore's web site, at, for example, its web page 111.

Accordingly, product information on a dress displayed on web page 111 is available on Dressco's web page 131, as the particular dress (product or item) is linked on the web page 111 to Dressco's particular web page, for example, web page 131, with the URL www.dressco.com. Accordingly, when a consumer, e.g., consumer 120 directs her browsing application (browser) to a dress on SuperStore's web page 111 (www.superstore.com/home), and "clicks on", touches, or swipes the desired dress, the underlying link (of the dress on web page 111) to the web page 131, is activated, and the consumer's 120 browser, in the device 120a is redirected to the URL of the web page 131, e.g., www.dressco.com/cocktail_black_567B at www.dressco.com, where the consumer 120 will see a graphic of product information for the desired dress.

While the servers 102, 110, 130a-130n are shown as a single device or machine, they may be a plurality of devices, machines, components and the like.

Figure 2:
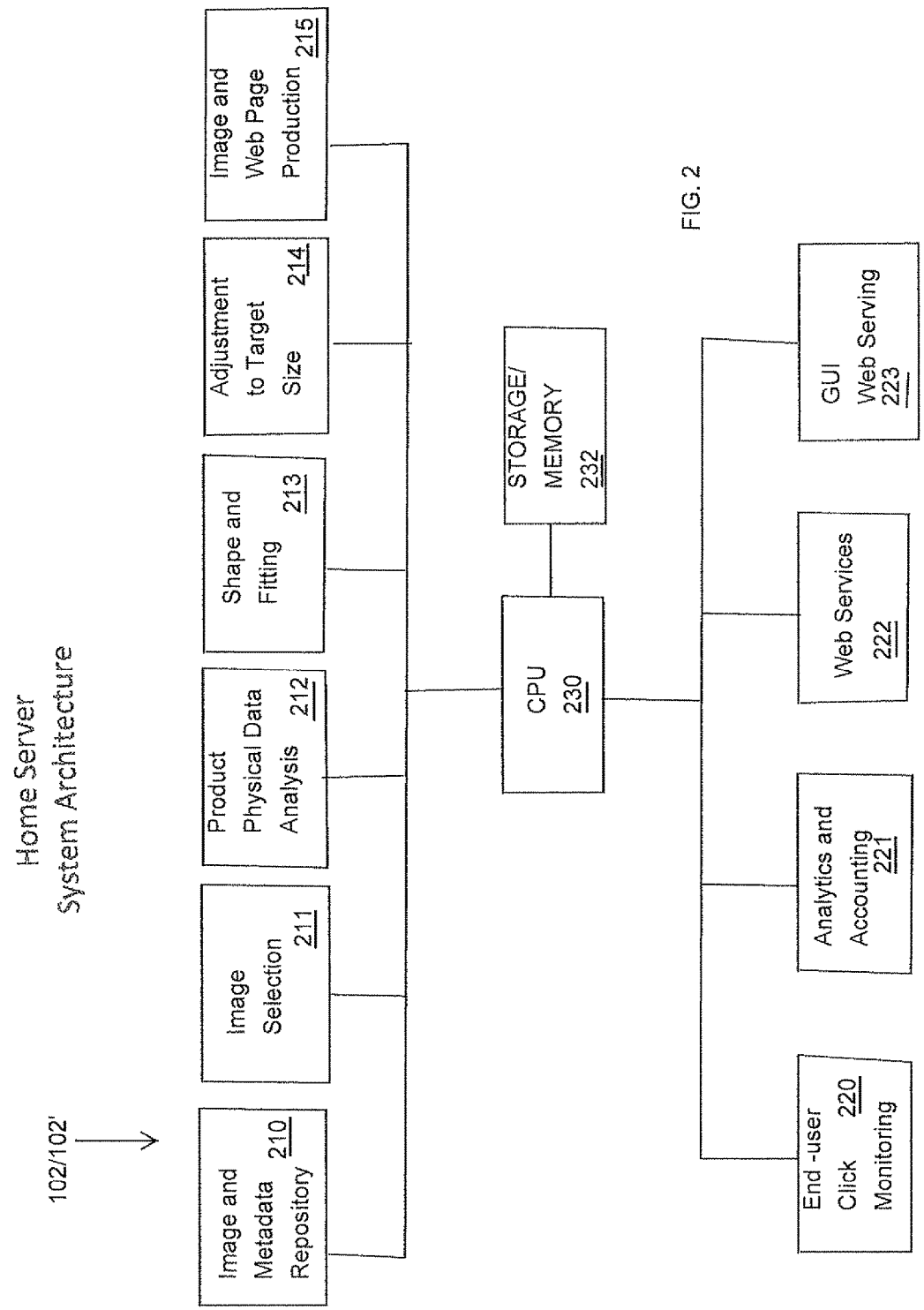
FIG. 2 is an architecture diagram of the system in accordance with embodiments of the invention.

FIG. 2 shows an exemplary architecture for the system 102' of the server 102 of the computer system of the present invention. The system 102' includes the product image and metadata repository 104 (FIG. 1), and other databases 106 (FIG. 1), and modules, primary 210-215, secondary 220-224, all of which are operatively coupled to processor(s) 230, and storage/memory 232. The product image and metadata repository 104 and databases 106, modules 210-215 and 220-224, processor(s) 230, and storage/memory 232, are in electronic and data communication with each other, either directly or indirectly.

While single modules 210-215 and 220-224, processors 230 and storage/memory 232, are shown, this is representative only, as each of these components may be a plurality of devices, and may be within or remote to the system 102', outside of the server 102. The modules 210-215 and 220-223 may be hardware, software, or combinations thereof. These modules 210-215, 220-223 store machine executable instructions for processors, such as the CPU 230, or other processors internal to the modules 210-215 and 220-223, for performing the processes described.

The image and metadata repository 104 and database(s) 106 are representative of storage media which, for example, serve as temporary storage for images, compositions, web pages and other electronic graphics produced by the system 102' or used in the production of the electronic graphics including, templates, compositions and the like.

An image and metadata repository module 210 serves to manage the image and data repository 104 and databases 106 associated with the server 102. An image selection module 211 functions to process selected images of products (also referred to as "items", these terms used interchangeably herein). A product physical data analysis module 212 maintains actual physical data and actual dimensions of the actual products, which are the subject of the corresponding images in the image repositories 104 and in some cases databases 106.

Shaping and fitting module 213 provides for the placement and arrangement of product images in the compositions and ultimately, the electronic graphics, in accordance with the processes detailed below.

Adjustment module 214 functions in adjusting the composition to the target size. The target size is, for example, desired dimensions for the composition and ultimately the electronic graphic, for example, in pixels or linear measurement, and in most cases, at a desired resolution, in accordance with the processes detailed below.

Image and Web Page Production module 215 serves to render final images to graphics files in the requested format, resolution and size, and produces HTML code (or other code, for example, Java, C++, and the like) for the display of the graphics file and execution of all runtime functionality for the end user, e.g., customer server 110.

Secondary modules 220-223, are associated with administrative aspects of the system 102' and in particular analytics for the electronic graphics and the products displayed in the electronic graphics.

End user click monitoring module 220 functions to receive the "clicks" (mouse activations, touches (if on a touch screen), or the like), that end users, such as consumers 120, 122 make on the various products displayed to them. For example, end user clicks may be for clicks on a product where the end user's browsing application is directed to a web page on a web site hosting product information, or to a web page or web site indicating a conversion, such as a purchase, a registration, a request for contact, or the like.

Analytics and Accounting module 221 computes the clicks received by the end user click monitoring module 220, and organizes the clicks into data usable by the users of the system 102', such as web page hosts, or entities associated with various products displayed in the various electronic graphics produced by the system 102'.

The Web Services module 222 serves to receive, e.g., over the Internet, both 1) the customer's requests (from customer computer 112), to produce visual compositions and, 2) instructions to download or transmit the visual instructions to the customer 112a, and also register actions taken by the consumers, for example, consumers 120, 122, on the visual composition web page, also known as an electronic graphic, at runtime.

The GUI Web Serving module 223 serves web pages, which enable the customers 112a, to request visual compositions, and download or transmit them to various destinations, including destinations over the network 50, for example, from the home server 102 (where the compositions are prepared). This module 223 serves JavaScript to the end user machines, e.g., computers 120a, 122a of consumers 120, 122, for example, the associated browsing applications at runtime.

The processors 230 control the operation of the system 102'. The processors 230 are conventional processors, such as those used in servers, computers, and other computerized devices. The processors 230 may be arranged to have a central processing unit (CPU), for controlling the system 102'. For example, the processors may include x86 Processors from AMD and Intel, Xenon® and Pentium® processors from Intel, and other processors. Other processors, such as those of the modules, may be any of the aforementioned processors.

The storage/memory 232 is conventional storage and memory, which is commercially available. The modules 210-215 and 220-223 may also include their own storage/memory in addition to the storage memory 232. This storage/memory 232 stores machine executable instructions associated with the operation of the modules 211-215 and 220-223. Also, the storage/memory 232, although shown as a single component for representative purposes, may be multiple components, and may be outboard from the system 102', and linked to the network 50.

Attention is now directed to FIGS. 3, 4, 5A and 5B, which form a flow diagram detailing a process in accordance with an embodiment of the disclosed subject matter. Reference is also made to elements shown in FIGS. 1 and 2, as well as the illustrations of FIGS. 6A-17. The processes and subprocesses of FIGS. 3, 4, 5A and 5B are computerized processes performed by the server 102, the system 102' of the server 102, and related components. The processes and subprocesses of the aforementioned flow diagrams are, for example, performed automatically and in real time. FIG. 6A is an automated arrangement of item images based on height and/or width, and clipping path information, and effected using a processes, for example, in the form of algorithms, described below.

Figure 3:
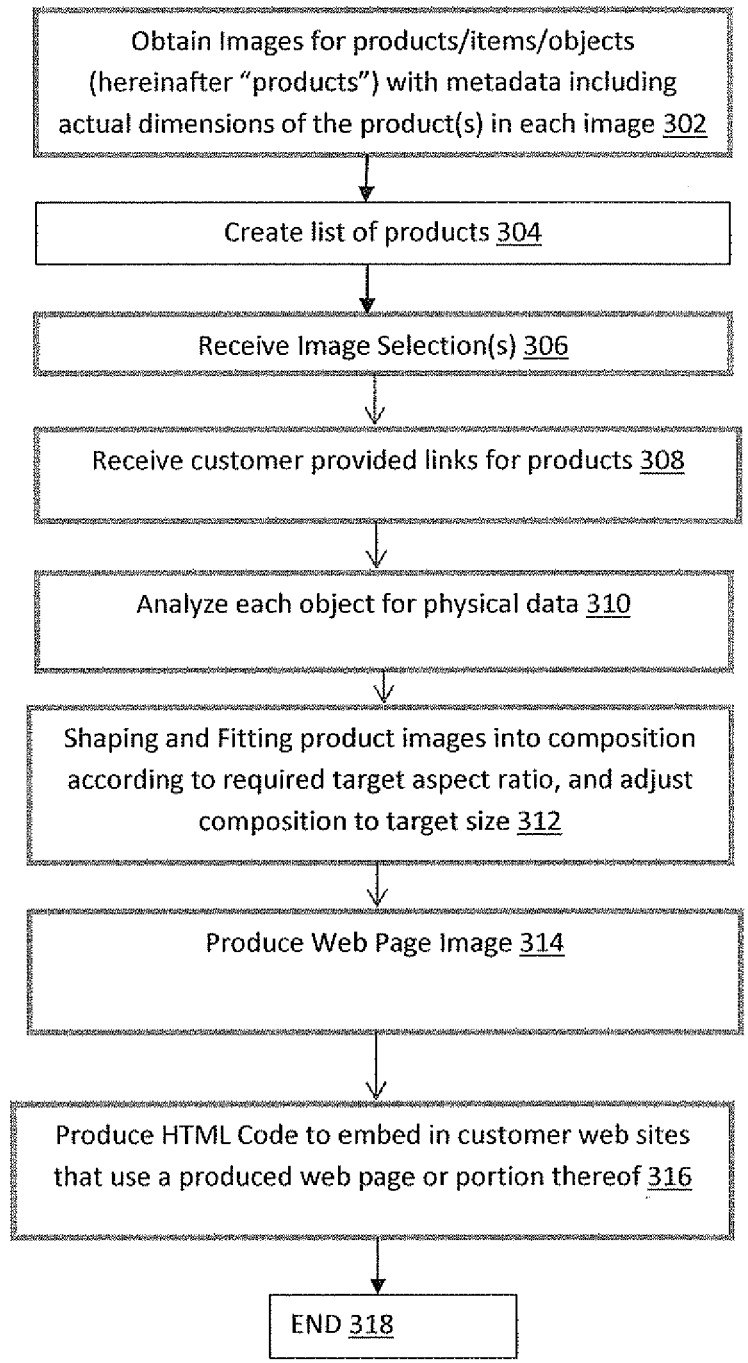
FIG. 3 is a flow diagram of a process in accordance with some embodiments of the present invention.

The process of FIG. 3 begins as images of products are obtained with the associated metadata. This metadata includes actual dimensions of the product(s) in each image, at block 302. The images and associated metadata are stored in the image repository 104. At block 304, a list of the products, also known as items, these terms used interchangeably herein, is created. The list of products, referred to as a "List of items", is as follows:

List of items:
Item(1) . . . Item(n) for which every item denoted as Item(i) has the following data:
Item real world height denoted as Item(i).Real_World_Height
Item real world width denoted as Item(i).Real_World_WidthItem Image denoted as Item (i).Image,
Every image has a clipping path, for separating the image portion related to the item from its surrounding background within the image, denoted as Item(i).Image.Clipping_Path.
The clipping path is defined as a Bézier curve or other method known in the art.

basis for a web page, electronic graphic, electronic document, or the like. This process is performed by the system 102' and the shaping and fitting modules 213 and target size adjustment module 214. Block 312 is detailed further in the flow diagrams of FIGS. 4, 5A and 5B, and discussed below.

With the shaping and fitting completed, the composition is used, for example, as the basis for a web page, created by the system 102', at block 314. The process moves to block 316, where the system 102' produces HTML code for embedding in the customer's web page(s)/web site(s) that use the system-created web page or portions thereof. The processes of blocks 312 and 314 are performed, for example, by the image and web page production module 215. The process ends at block 318.

Figure 4:
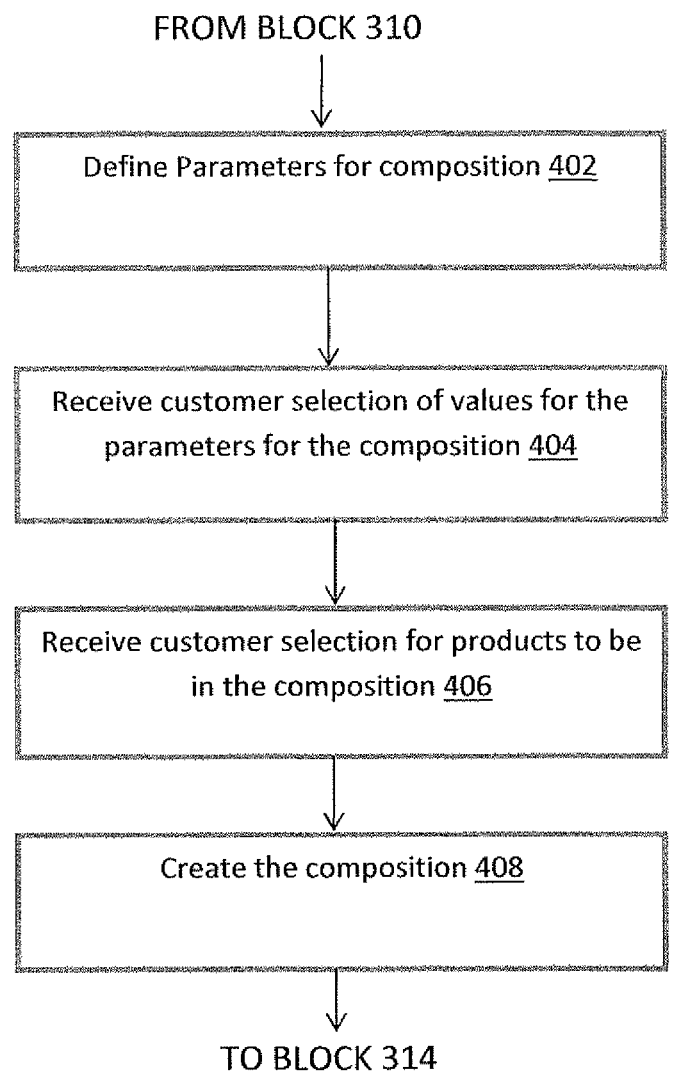
FIG. 4 is a flow diagram of the process of Block 312 of FIG. 3.
Figure 5A:
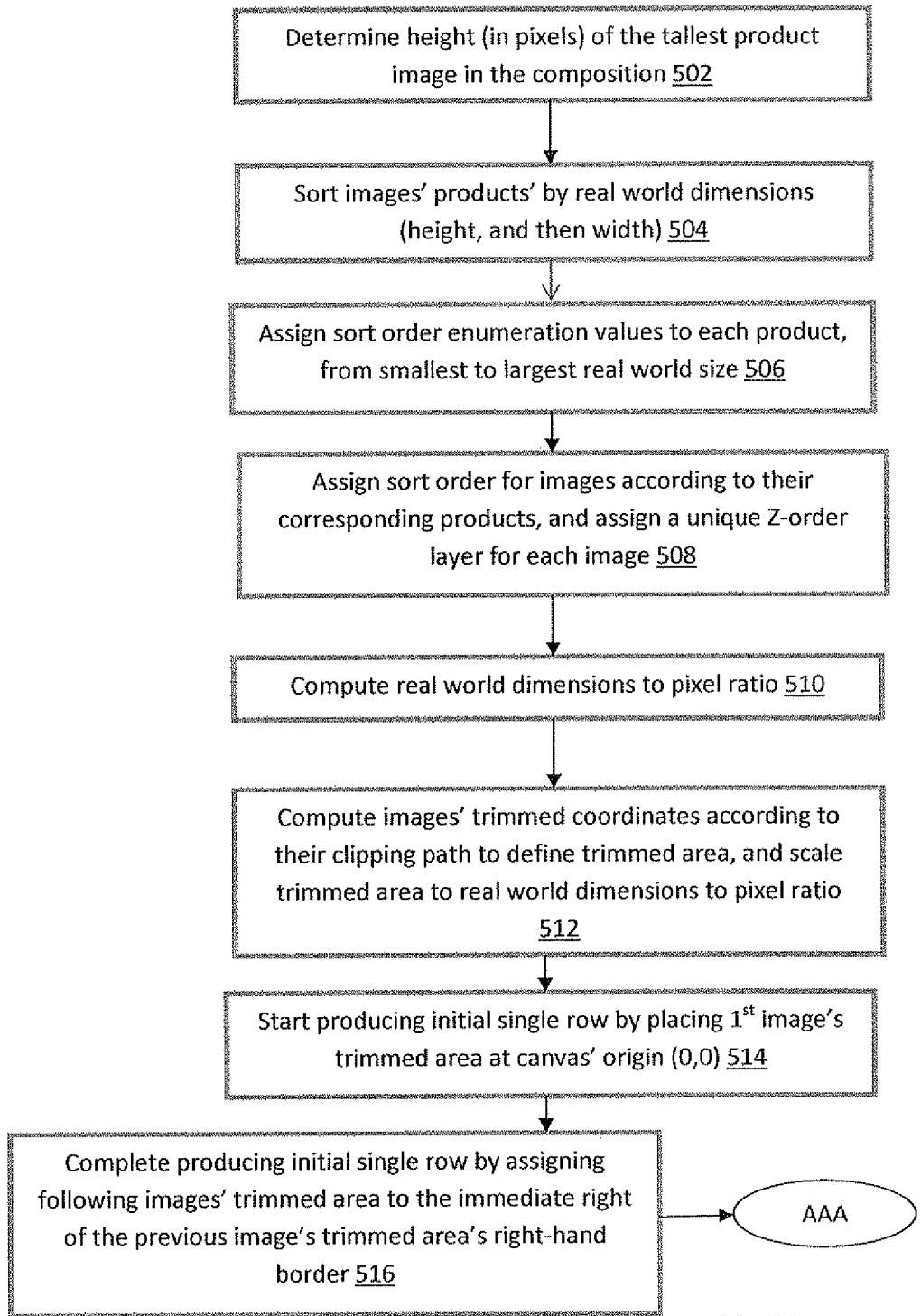
FIGS. 5A and 5B are a flow diagram of the process of Block 408 of FIG. 4.
Figure 5B:
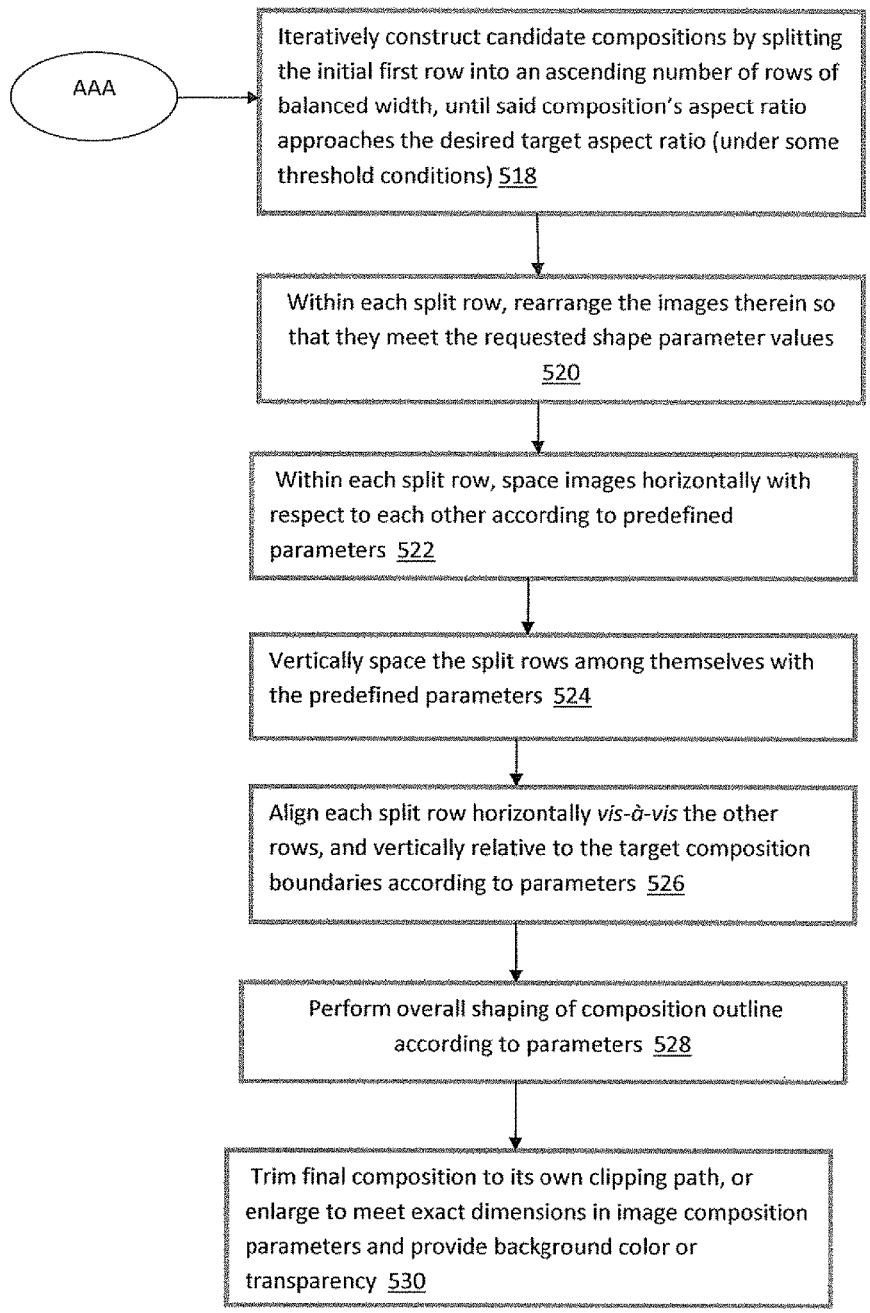
Figure 6A:
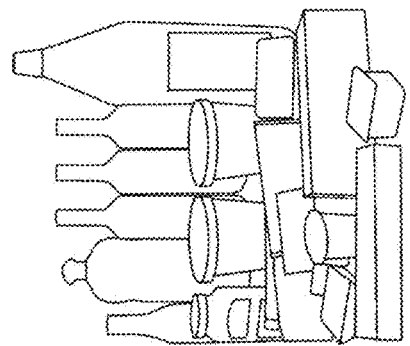

Turning back to block 312, attention is directed to FIGS. 4, 5A and 5B, which provide additional detail for the shaping and fitting processes. These processes are performed, for example, in the shaping and fitting module 213 of the system 102'.

Beginning in FIG. 4, at block 402, parameters are defined for the image composition. These parameters are such that any number of or any combination of parameters may be used, depending on selection. The parameters include, for example:

Image Composition Request Parameters:
(Defaults are Bold and Underlined)

| Item_No | Image_File | Item_Real__World_Width | Item_Real__World_Height | No_Of_Repetitions | Link | Too tip | . . . |
|---|---|---|---|---|---|---|---|
| 1 | | | | | | | |
| 2 | | | | | | | |
| . . . | | | | | | | |
| 10 | | | | | | | |

Figure 6B:
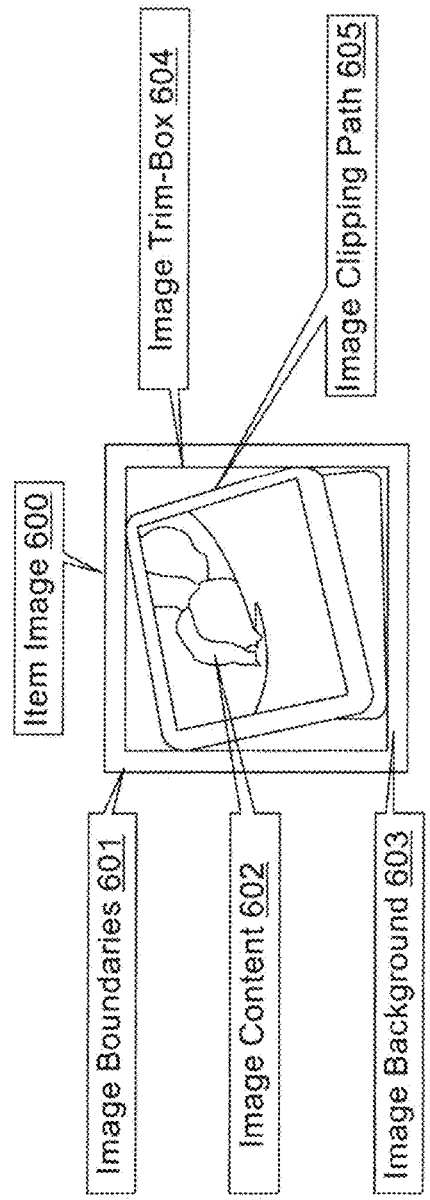

FIG. 6B provides an exemplary pictorial identification of an item image 600, including the item's image boundaries 601, image content 602, image background 603, image trim box 604, and image clipping path 605. FIG. 6C shows the image trim box 604 and clipping path 605 in greater detail. The clipping path 605 is shown as a broken line outline of the item, e.g., image content 602. A list of item (product or object) images is optionally accompanied by the aforementioned item data and image composition request parameters, if values other than the default values are desired.

The system 102' receives an image selection or selections, at block 306, from a customer, for example the customer, represented by the person 112a. The image selection is received and processed by the module 211.

The system 102' also receives customer 112a provided links for the products, at block 308. The links are, for example, HTML code linking the products to predetermined destinations over the network, for example, the Internet 50. For example, the HTML links may direct browsing applications to the web pages of the customer, web pages associated with the product, which provide product details, and there may be a link to an entity which performs analytics and accounting functions, such as the server 102.

Each product is then analyzed for physical data, at block 310. The analysis is performed by the module 212 of the system 102'.

The process moves to block 312, where the selected product images are shaped and fitted into a composition according to a required target aspect ratio, and the composition is adjusted to the target media size. The composition is, for example, an electronic document, which serves as a 1. CompositionOutline—the shape of the general outline of the composition. Values include, but are not limited to: "ShortestToTallest"|"TallestToShortest"|"ConcaveTop"|"ConvexTop"
2. HorizontalAlignment—the horizontal alignment of the image rows within the composition Values are "Center"|"Right"|Left
3. VerticalSpacingBasis—the basis for measuring the start of the current row of item images vis-à-vis the row immediately below it. Values are "LowestTopInRowBelow" (Tight)|"TallestTopInRowBelow" (Loose)
4. VerticalSpace—the base offset of the bottom line of the current row of item images relative to the row below it, according to the VerticalSpacingBasis selected, above. Example "85" %
5. ClippingPathMode—Mode of behavior to be applied to the part of the image which lies outside the clipping path. Values are: "MakeTransparent"|"ConvertToBackgroundColor"
6. WidthPX="450" HeightPX="450"—Desired width and height of the final composition, in pixels.
7. Trimming—Trimming action to be performed on the final composition, which may be slightly smaller than the requested dimension. Values are Trim (the composition is trimmed to the minimum size required to contain all images' clipping paths)| CenterOfRequestedDimesions (the originally requested dimensions are honored, and the composition is centered within those dimensions)

8. BackgroundColor—Color to be applied (in web RGB format) to the background of the image, outside of the union of the clipping paths of the item images. Example "#FFFFFF";
9. ColorModel—Color Model for the composition. Values are
   RGB(RedGreenBlueforlight,suchasmonitors)|CMYK (Cyan, Magenta, Yellow, Key (Black)) for pigment, such as for printing.
10. ImageFormat—Requested image format. Values are Png|Jpeg|Tiff|Gif
11. ResolutionPpi—resolution for the composition in pixels per inch (also commonly referred to as DPI—dots per inch). If the ImageFormat is Png then 72 is default; if Jpeg then 300 is default.
12. StrokeEffect—stroke (highlighting) to be applied (if any) to each individual item image's clipping path. Values are None|Solid|Gradient|Animation
13. StrokeColor Color to be applied to the outline of the Clipping Path in the RGB (Red, Green, Blue) color model, specified as a web color. Example is "#000000"
14. StrokeWidthPX—width in pixels of the clipping path stroke: Example: 1
15. HorizontalSpacingBasis—the basis for spacing product images horizontally. Values are: "Gap" (Horizontal distance measured by the gap between two neighboring images' trimmed boxes. GUI caption is "Loose")| Kerning (Distance measured relative to the minimum horizontal distance possible between two item images without their respective clipping paths overlapping. GUI Caption is "Tight").
16. HorizontalSpace—horizontal space, in pixels, between two neighboring item images, as figured on the basis of the HorizontalSpacingBasis. Example: "0":
17. UniformDimension—should uniform dimensions be assumed for all item images (primarily for the case where real world dimensions are not available), or should the effective dimensions be determined by relative real world height and/or width among products:
    Logarithmic: Product images' visual size in the final visual composition is based on the relative differences in actual or "real world" height and/or width amongst the product images' products; but undergo a compression algorithm based largely on logarithmic compression so as to attenuate the difference in actual size among extremely large and extremely small products.
    Width: Dictate a uniform "real world" width for all products, so that all product images in the final visual composition will have the same visual width, while preserving the product images' original aspect ratio.
    Height: Dictate a uniform "real world" height for all products, so that all product images in the final visual composition will have the same visual height, while preserving the product images' original aspect ratio.

The above parameters may be provided directly by an external system accessing the AIC of the system 102', or through the GUI 223 provided by the modules 222 and 223.

The process moves to block 404, where a customer's (e.g., customer 112a) selection of values for the image composition parameters is received by the system 102'. At block 406, a selection for products to be used in the composition is received from the customer by the system 102'. The system 102' then creates the required composition, at block 408. The process of block 408 is detailed further in FIGS. 5A and 5B. With the process complete, the process moves to block 314 (FIG. 3).

The process of block 408 is now discussed in detail, with reference to the flow diagrams of FIGS. 5A and 5B.

At block 502, the height (e.g., in pixels) of the tallest product in its respective product image (or alternatively, the width in other product images), in the composition, is determined. The products in their respective images are sorted by their actual or "real world" dimensions, at block 504. The process moves to block 506 where sort order enumeration values are assigned to each product, in the order of smallest to largest (or alternatively, largest to smallest), in accordance with the product's actual or "real world" size.

The process moves to block 508, where a sort order for images is assigned according to their corresponding products, and assigning a unique Z-order layer for each image.

At block 510, the actual or "real world" dimensions of the products (items) to pixel ratio are computed.

At block 512, the image's trimmed coordinates are computed according to their clipping path to define a trimmed area. The "clipping path" is a predefined outline of a product within the image. The "trimmed area" is the bounding box rectangle of the exact minimum dimensions required so as to exactly intersect the leftmost, rightmost, topmost, and bottommost points of the clipping path (605 in FIGS. 6B and 6C). The trimmed area is then scaled to actual or "real world" dimensions by a pixel ratio.

At block 514, the images are initially arranged in the composition, as an initial single row of images produced by placing a first image at a first designated orientation in the composition, e.g., the canvas origin. The canvas origin is, for example, the trimmed area of the image is placed at x,y coordinates (0,0) of a first row of the canvas. This arrangement continues at block 516, as additional trimmed areas of images are assigned in the designated row to the immediate right of the previous image trimmed area, which was placed in the canvas.

The process continues at block 518, where candidate compositions are iteratively constructed by splitting the first row, completed in block 516, into an ascending number of rows of balanced with, until the aspect ratio of the composition approaches the desired target aspect ratio. For example, this may occur under some threshold conditions. This process may repeat for as long as desired, until the target aspect ratio is met (or best approximation met).

Moving to block 520, within each split row, from block 518, the images are rearranged to meet the requested shape parameter values.

Next, at block 522, within each split row, the images are spaced horizontally with respect to each other according to predefined parameters. These predefined parameters may be, for example, Horizontal Space=90% (or 2 mm to 5 mm pixels).

Moving to block 524, the split rows are then vertically spaced among themselves in accordance with the selected predefined parameters. Next, each split row is aligned horizontally with respect to the other (horizontal) rows, and vertically relative to the target composition boundaries, according to the selected parameters, at block 526.

At block 528, an overall shaping of the composition outline according to parameters is formed.

This subprocess concludes at block 530, where the final composition is trimmed to its own clipping path, or the final composition is enlarged to meet the exact dimensions of the image composition parameters. Additionally, a background color or transparency is applied to the composition.

The process then returns, to block 408, and subsequently, to block 312, from where the process resumes, as detailed for FIG. 3 above.

The processes and subprocesses of FIGS. 5A and 5B are also shown in pseudo code. In this pseudo-code "Image" is the product (item or object) image. The pseudo code is as follows:

1) Block 502—Max_Item_Height_On_Canvas:=HeightPX
2) Block 504—Sort items (Item(1) . . . Item(n)) Ascending
   a. Primary Sort by Item_Real_World_Height,
   b. Secondary Sort by Item_Real_World_Width;
3) Block 506—For each Item, Item_Sort_Order:=Sort Order Number according to the above mentioned sort
   Resulting with Item(1) is the shortest item and Item(n) is the tallest item
4) Block 508—For I:=1 to n (Item 1 to Item n),
   a. Image(i).Sort_Order:=Item(i).Item_Sort_Order
   b. Image(i).Layer No:=Item(i).Item_Sort_ Order Result:
   Image(1) is positioned on the front-most layer, layer 1, and linked to the shortest item
   Image(n) is positioned on the back-most layer, layer n, and linked to the tallest item 5) Block 510—Item_To_Canvas_Scale:=Item(n). Real_World_Height/Max_Item_Height_On_Canvas
6) Block 512—For I:=1 to n do:
   a. Image(i).Trim_Box_Height:=Image(i).Clipping_Path.Max_Y—Image(i).Clipping_Path.Min_Y
   b. Image(i).Trim_Box_Width:=Image(i).Clipping_Path.Max_X—Image(i).Clipping_Path.Min_X
   c. Image(i). Trim_Box_Height_On_Canvas:= Item(i).Adjusted_Height*Item_To_Canvas_Scale
   d. Image(i). Image_To_Canvas_Scale:=Image(i). Trim_Box_Height/Image(i). Trim_Box_Height_On_Canvas
   e. Image(i).Width_On_Canvas:=Image(i).Trim_Box_Width*Image(i). Image_To_Canvas_Scale Result: Each image is scaled so that its trim-box is proportional to the trim-box size of the highest item, and the highest item is sized to the maximum available height on canvas denoted above as Max_Item_Height_On_Canvas.

The proportional size among items in the resulting composition may be calculated based on a metric preserving the sort order such as percentage or logarithmic size and place on canvas; this derived height is denoted above as Adjusted_Height and is the height after applying some optional function to amplify or to compress the size differences among items.

Figure 7:
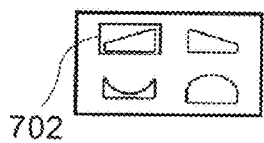
Figure 8:
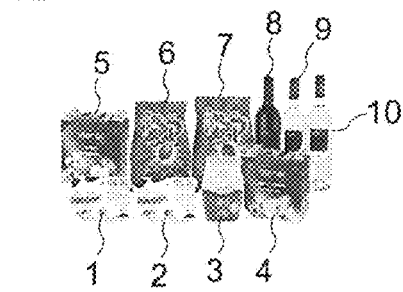
Figure 9:
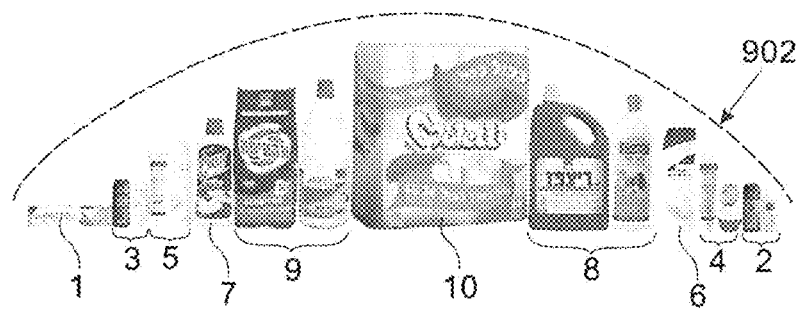
Figure 10:
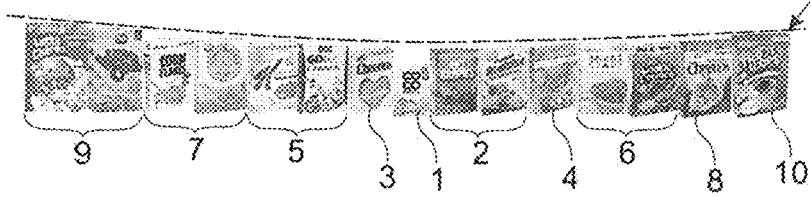
Figure 11:
Figure 13A:
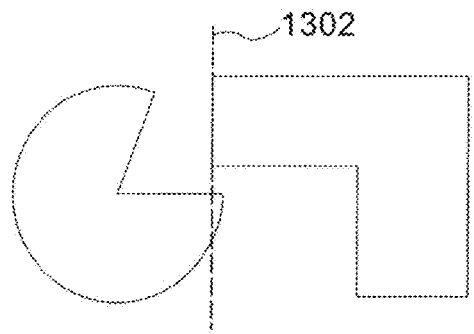

7) Block 514—Shift Image(1).Trim_Box to the (0,0) of the canvas
   Image(1). trim-box.X_Min:=0; Image(1). trim-box.Y_Min:=0
8) Block 516—For i:=2 to n, shift Image(i) so that Image (i).Trim-Box.Y_Min:=0; and Image(i).Trim-Box.X_Min to the right of Image(i–1) by using the following
   Image(i).Trim-Box.Y_Min:=0; Image(i).Trim-Box.X_Min:=Image(i–1).Trim-Box.X_Max
   Result: INITIAL ROW, All images are sized proportionally, and positioned from left to right, from the shortest to tallest, from the front most to the backmost. See FIG. 3
9) Block 518—Inter-Row_Arrangement
   Min_No_Of_Rows:=1; Max_No_Of Rows:=No_Of_Images;
   Target_Composition_Aspect_Ratio:=Request.HeightPX/Request.WidthPX For r:=Min_No_Of Rows to Max_No_Of Rows Do:
Split the initial row, by means of r–1 break points, into r balanced rows, so that all resulting rows would be with as similar width as can be attained.
For i:=1 to n
   IF image(i).row_no==1 THEN Image(i).Trim_Box.Y_Min:=0
   ELSE
      Image(i).Trim_Box.Y_Min:=Row(i–1).Baseline. Y_position+VSpace(Row(i–1).First_Image. Trim_Box.Height)
      Where VSpace function is a vertical spacing function e.g., 85% of the row minimal image height for achieving loose or tight vertical spacing between the rows
   IF image(i) is first image in this row THEN
      Image(i).Trim_Box.X_Min:=0
      ELSE
      Image(i).Trim_Box.X_Min:=Image(i–1).Trim_Box.X_Max
Next i
Composition(r).Height:=Image(n).Trim_Box.Y_Max–Image(1).Trim_Box.Y_Min
Composition(r).Width:=Maximum Width of all the r Rows in that composition
Composition(r).Aspect_Ratio:=Composition(r).Height/ Composition(r).Width IF Composition_Aspect_Ratio>=Target_Composition_ Aspect_Ratio THEN EXIT LOOP i
ELSE NEXT r
Select the composition with the most balanced rows and aspect ratio that is closest to the target aspect ratio 10) Block 520—Intra-Row_Arrangement
Change the intra-row image order to get a desired composition outline including but not limited to one of the following effects, as shown in FIG. 7 (where the upward triangular arrangement 702 has been selected).
   shortest to tallest—the image intra-row-order is ascending, same image order as in the initial row, for example, images 1, 2, 3, 4, 5, 6, 7, 8, 9, 10 in a row will be reordered 1, 2, 3, 4, 5, 6, 7, 8, 9, 10, as shown in FIG. 8.
   Tallest to shortest—the image intra-row-order is descending, the opposite order of the initial row
      e.g., images 1, 2, 3, 4, 5, 6, 7, 8, 9, 10 in a row will be reordered 10, 9, 8, 7, 6, 5, 4, 3, 2, 1
   Convex—odd numbered images ascending then even numbered images descending
      e.g. images 1, 2, 3, 4, 5, 6, 7, 8, 9, 10 in a row will be reordered 1, 3, 5, 7, 9, 10, 8, 6, 4, 2, as shown, for example, in FIG. 9 (the convex shape illustrated by the broken line 902).
   Concave—Odd numbered images descending then even numbered images ascending
      e.g., images 1, 2, 3, 4, 5, 6, 7, 8, 9, 10 in a row will be reordered 9, 7, 5, 3, 1, 2, 4, 6, 8, 10, as shown, for example, in FIG. 10 (the concave shape illustrated by the broken line 1002).
   Other ordering may be as follows:
   Two unequal Rows (1101, 1102), best balanced, Ordered Shortest To Tallest, Align Center, Wide Aspect Ratio, as shown, for example, in FIG. 11; or,
   Three unequal Rows (1201, 1202, 1203) best balanced, Ordered Shortest To Tallest, Align Center, Square Aspect Ratio, for example, in FIG. 12.
11) Block 522—Horizontal Spacing: Loose or Tight
Horizontal positive or negative gap between images to get a tight or loose effect, can be added with two options:

Loose: Means that Horizontal gap is relative to the touch point between the trim-boxes of the images. Touch Point between trim-boxes is the first point of overlap (broken line 1302) when two trim-boxes are brought progressively closer horizontally, as shown in FIG. 13A.

Figure 12:
Figure 13B:
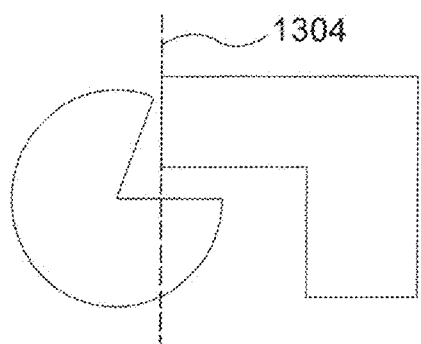
Figure 14A:
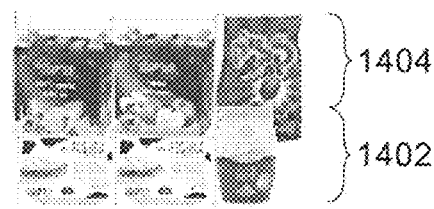
Figure 14B:
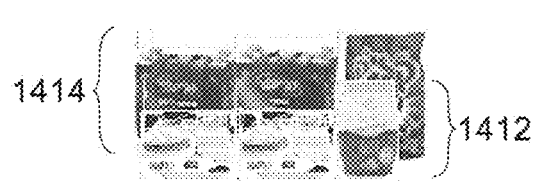
Figure 15:
Figures 16A, 16B, 16C:
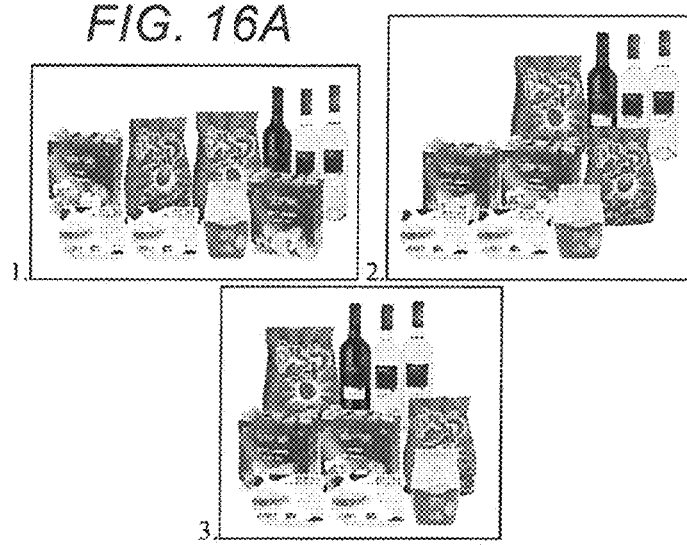

Tight: Means that Horizontal Gap is relative to the touch point between the clipping paths of the images. Touch Point between clipping paths is the first point of overlap (broken line 1304) when two clipping paths are brought progressively closer horizontally, as shown in FIG. 13B 12) Block 524—Inter Row Vertical Spacing Vertical Baseline Spacing (Inter-Row) as a percentage (%) of Row_Min_Height, as shown in FIG. 14A, where the Sample is at 90%. (Row 1402 is 90% of Row 1404), and FIG. 14B, where the sample is at 25% (Row 1412 is 25% of Row 1414). Row_Min_Height means the height of the lowest image in the row.

13) Block 526—Alignment (Inter-Row):

Horizontal: Left, Right, Center, Block (common). As shown, for example, in FIG. 15, there are three unequal Rows 1501, 1502, 1503, best balanced, ordered Shortest To Tallest, Align Center, Square Aspect Ratio Vertical: Top, Bottom, Center, Block (rare)

14) Block 528—Composition Outline Options

| Rows | Items | Split rows by | dX | dY | Space B/W |
|---|---|---|---|---|---|
| 1 | 1 . . . N, ------ | | 0 | 0 | 0, % of item |
| 2 | 1 . . . N, ---- or / or \ | 1. Square Result (FIG. 16a) 2. Tall Result (FIG. 16B) 3. Wide Result (FIG. 16C) 4. Circle Result 5. Top Triangle Result 6. Bottom Triangle Result 8. Similar Height Items 9. Similar row width 10. Parallelogram Result 11. By Ratio: 1-2-3; 3-2-1; 1-1-1 | >0 | | |
| 3 | | 2 + Circle | | | |

Additional criteria which may be used when designing the composition includes, Success Criteria, which are in Section 15 as follows.

15) Success Criteria: one or more from the following:
   1) Composition Aspect Ratio vs. Requested Target Aspect Ratio
   2) Composition Max overlap %, Min Overlap %, Accumulated Overlap %
   3) Composition Size vs. requested size
   4) Composition Front/Background Ratio
   5) Composition row min image size, row max image size, row average image size.

Figure 17:
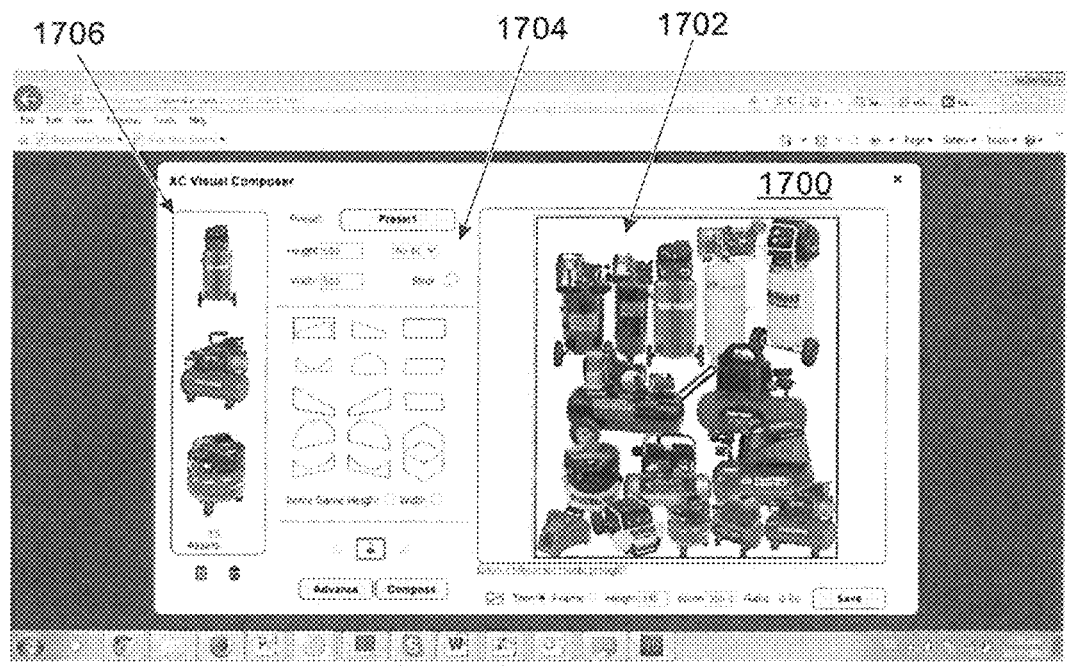
FIG. 17 is a Graphic User Interface (GUI) in accordance with embodiments of the present invention; and, FIGS. 18A-18D are a GUI in accordance with embodiments of the present invention in an exemplary operation.

16) Graphic User Interface (GUI)—FIG. 17 details a screen diagram of a GUI 1700 from which the customer 112*a* can use the system detailed above, to create the desired composition, which is, for example, an electronic document. Once the composition reaches the customer server 110, it can be made into an electronic graphic, such as a web page, e-mail, banner, rollup, scroll-up, pop-behind, or the like. For example, in FIG. 17, the GUI 1700 includes an area which shows the composition 1702, an area for customer selections 1704 and some products 1706, shown in relative actual dimensions to each other. This is the same in the composition 1702, where the products (items) are shown at their relative actual dimensions, e.g., heights, widths, and depths, with respect to each other.

Figure 18A:
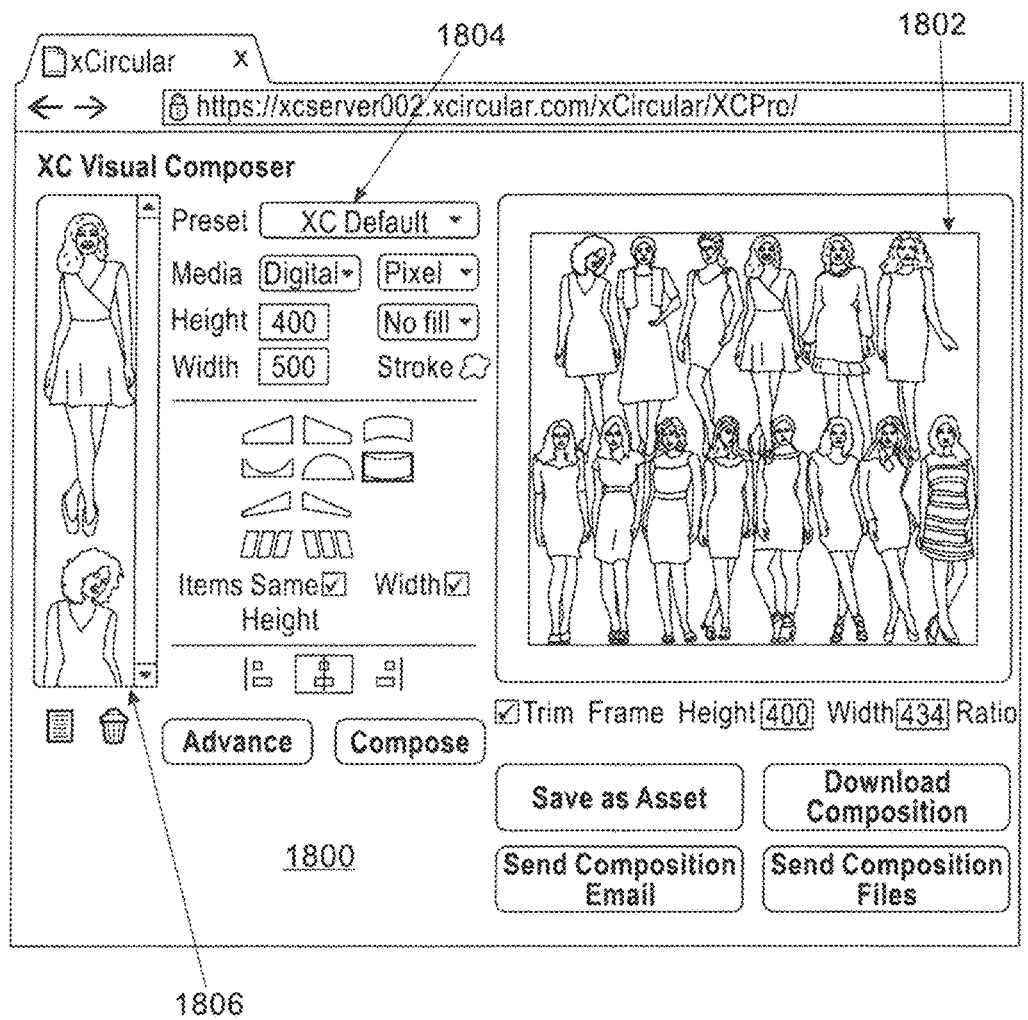

FIGS. 18A-18D detail screen diagrams of GUIs 1800, from which the customer 112*a* can use the system detailed above, to create the desired composition, for example composition 1802' on FIG. 18D. For example, in FIG. 18A, the GUI 1800 includes an area which shows the present composition 1802, an area for customer selections 1804 and models wearing the products (dresses) 1806. The models are shown in relative actual dimensions, e.g., heights, widths and depths, in perspective.

Figure 18B:
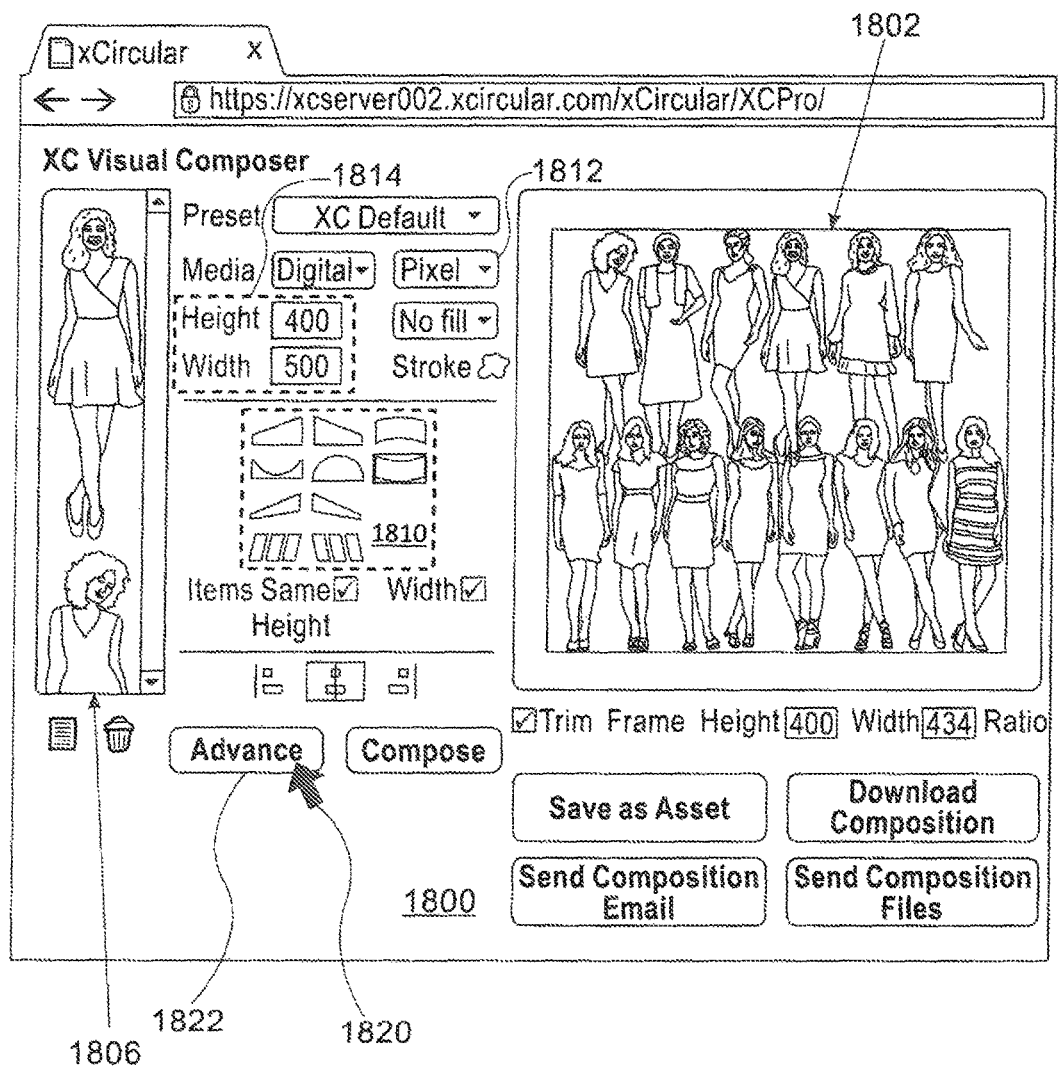

FIG. 18B shows the GUI 1800 with some exemplary parameters, which may be set be the customer 112*a* in broken line boxes for emphasis only. For example, the display pattern, in various shapes, is shown in box 1810, and the size of the composition, for example, in pixels 1812, is shown in box 1814. For example, the customer 112*a* wants to set advanced parameters, hence, the click 1820 on the "Advance" button 1822, such that the "Advance" menu 1830 appears in FIG. 18C.

Figure 18C:
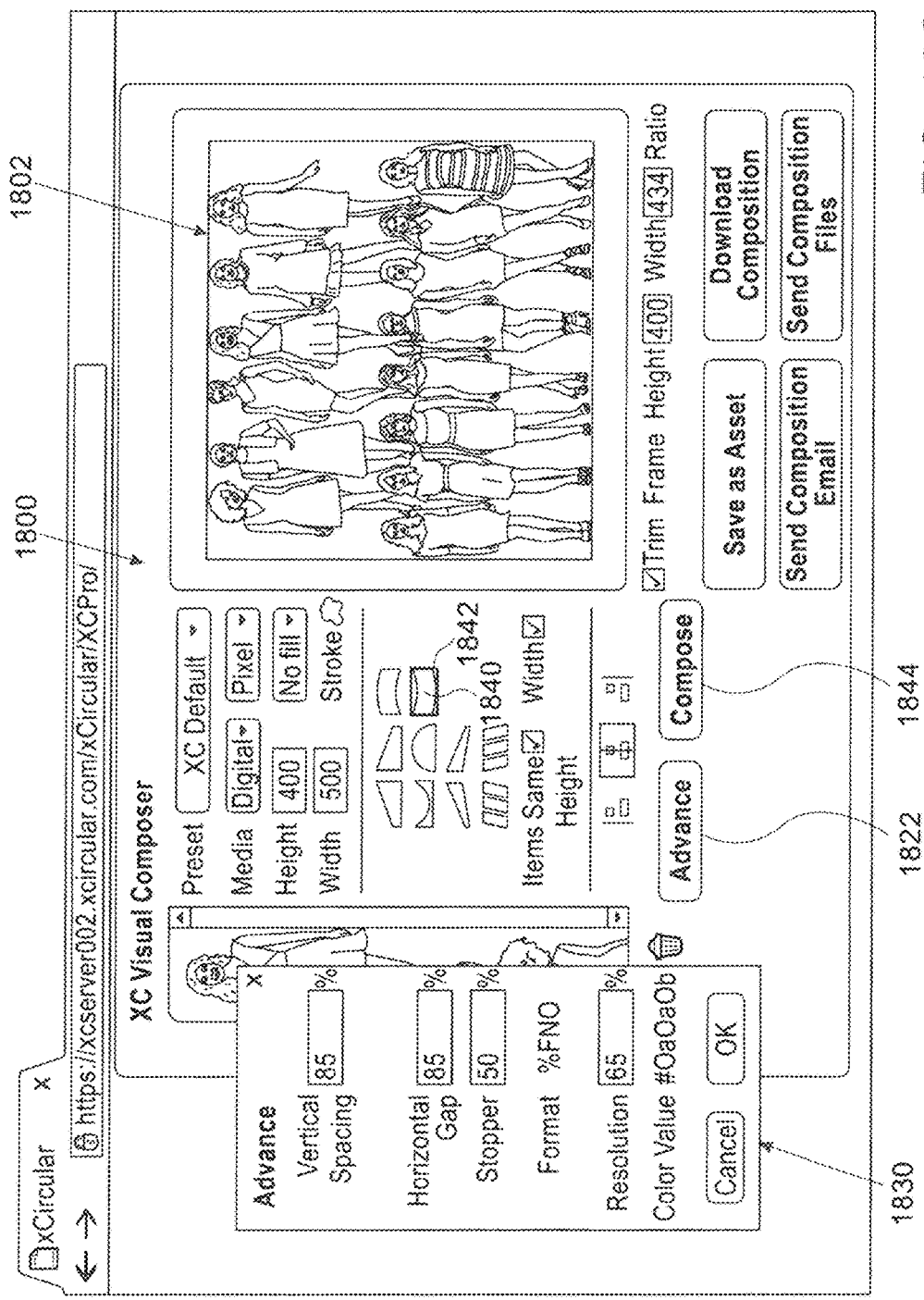

In FIG. 18C, the advance parameters, for example, model spacing from each other, horizontal and vertical, are set in the menu 1830 and the display pattern, "concave" 1840 is selected, illustrated by the selection rectangle 1842 around the concave pattern. Once this "Compose" button 1844 is "clicked" on or otherwise activated, the models of the composition 1802 are reorganized to the final composition 1802' of FIG. 18D, in which the models are arranged in accordance with the "concave" display pattern, at the spacing from the advance parameter selection, as well as the parameters of the central section 1804.

In FIG. 18D, the final composition 1802' in the trim box 1848, may be trimmed 1850, saved 1852, downloaded 1854 and sent as email 1856, or the composition file sent 1858, for example, to the customer 112*a*, for example the server 110.

17) Hyperlinks, tooltips, mouse over, etc.

A click map based on the image clipping path and layer number is created. This click map enables additional navigation, data, and behavior functionalities associated with each image.

The system 102' includes a database of images, preferably including one of the real world width/height values of the item associated with each image and a clipping path of the image.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

While the invention has been described with respect to a limited number of embodiments, it will be appreciated that many variations, modifications and other applications of the invention may be made.

The invention claimed is:

1. A computer-implemented method for creating an electronic graphic comprising:
   obtaining, by a processor, selected product images for products including actual real world dimensions of the products;
   by a processor:
   a) calculating dimensions and positions for any number of selected product images for filling in an external outline defined by a display pattern, in accordance with an aspect ratio of a selected target size;
   b) maintaining relative proportions between the actual real world dimensions of the products of the product images with respect to each other; and,
   c) creating a composition within the display pattern, which includes the product images, by:
      1) for each selected product image, defining a trimmed area presenting the product;
      2) scaling each trimmed area proportionally to the trimmed area of the other product images, keeping the same ratio between the actual real world dimensions and image units of measure;
      3) starting at a selected origin of the outline defined by the display pattern, laterally placing each trimmed area for the corresponding selected product image in succession, to create an initial row of the scaled trimmed areas; and,
      4) should the initial row fail to meet the aspect ratio of the selected target size, dividing the initial row into multiple rows to fit the composition within a predetermined threshold condition of the aspect ratio of the selected target size; and,
   scaling, by a processor, the resulting composition proportionally, to fit to the selected target size.

2. The method of claim 1, wherein the image units of measure is in one of pixels or linear measure.

3. The method of claim 1, additionally comprising: associating at least one activatable action with the product images in the electronic graphic.

4. The method of claim 3, wherein the at least one activatable action is selected from the group consisting of a link to a network destination, shopping transaction, electronic commerce transaction, graphic effect, user interaction.

5. The method of claim 1, wherein the display pattern is selected from a plurality of display patterns.

6. The method of claim 5, wherein the display pattern allows for overlap of the product images.

7. The method of claim 5, wherein the display pattern allows for spacing between the product images.

8. The method of claim 1, wherein the composition is an electronic document, transmittable over a computer network, and which serves as the basis for the electronic graphic.

9. The method of claim 1, wherein the obtaining, by the processor, the product images includes receiving, by the processor, said any number of selected product images.

10. A computer system for creating an electronic graphic, comprising:
a storage medium for storing computer components; and,
a computerized processor for executing the computer components comprising:
a first component for obtaining selected product images for products including actual real world dimensions of the products;
a second component for:
a) calculating dimensions and positions for any number of selected product images for filling into an external outline defined by a display pattern, in accordance with an aspect ratio of a selected target size;
b) maintaining the relative proportions between the actual real world dimensions of the products of the product images with respect to each other; and,
c) creating a composition within the display pattern, which includes the product images, by:
1) for each selected product image, defining a trimmed area presenting the product;
2) scaling each trimmed area proportionally to the trimmed area of the other product images, keeping the same ratio between the actual real world dimensions and image units of measure;
3) starting at a selected origin of the outline defined by the display pattern, laterally placing each trimmed area for the corresponding selected product image in succession, to create an initial row of the scaled trimmed areas; and,
4) should the initial row fail to meet the aspect ratio of the selected target size, dividing the initial row into multiple rows to fit the composition within a predetermined threshold condition of the aspect ratio of the selected target size; and,
a third component for scaling the resulting composition proportionally, to fit to the selected target size.

11. The computer system of claim 10, additionally comprising: a fourth component for associating at least one activatable action with the product images in the electronic graphic.

12. The computer system of claim 11, wherein the at least one activatable action is selected from the group consisting of a link to a network destination, shopping transaction, electronic commerce transaction, graphic effect, user interaction.

13. The computer system of claim 10, additionally comprising: a fourth component for arranging the product images including overlapping the product images with respect to each other.

14. The computer system of claim 10, additionally comprising: a fifth component for arranging the product images to allow for spacing between the product images.

15. The computer system of claim 10, wherein the obtaining the selected product images includes receiving said any number of selected product images.

16. A computer usable non-transitory storage medium having a computer program embodied thereon for causing a suitable programmed system to create an electronic graphic, by performing the following steps when such program is executed on the system, the steps comprising:
obtaining selected product images for products including actual real world dimensions of the products;
calculating dimensions and positions for any number of selected product images for filling into an external outline defined by a display pattern, in accordance with an aspect ratio of a selected target size;
maintaining the relative proportions between the actual real world dimensions of the products of the product images with respect to each other; and,
creating a composition of within the display pattern, which includes the product images, by:
1) for each selected product image, defining a trimmed area presenting the product;
2) scaling each trimmed area proportionally to the trimmed area of the other product images, keeping the same ratio between the actual real world dimensions and image units of measure;
3) starting at a selected origin of the outline defined by the display pattern, laterally placing each trimmed area for the corresponding selected product image in succession, to create an initial row of the scaled trimmed areas; and,
4) should the initial row fail to meet the aspect ratio of the selected target size, dividing the initial row into multiple rows to fit the composition within a predetermined threshold condition of the aspect ratio of the selected target size; and,
scaling the resulting composition proportionally, to fit to the selected target size.

17. The computer usable non-transitory storage medium of claim 16, wherein the image units of measure is in one of pixels or linear measure.

18. The computer usable non-transitory storage medium of claim 16, wherein the display pattern is selected from a plurality of display patterns.

19. The computer usable non-transitory storage medium of claim 18, wherein the display pattern allows for overlap of the product images.

20. The computer usable non-transitory storage medium of claim 18, wherein the display pattern allows for spacing between the product images.

21. The computer usable non-transitory storage medium of claim 16, wherein the steps additionally comprise: associating at least one activatable action with the product images in the electronic graphic.

22. The computer usable non-transitory storage medium of claim 21, wherein the at least one activatable action is selected from the group consisting of a link to a network destination, shopping transaction, electronic commerce transaction, graphic effect, user interaction.

23. The computer usable non-transitory storage medium of claim 16, wherein the obtaining the selected product images includes receiving said any number of selected product images.

* * * * *